(12) United States Patent
Zweesaardt

(10) Patent No.: US 7,324,409 B1
(45) Date of Patent: Jan. 29, 2008

(54) SOLAR POWERED, MOBILE BIRD PEST CONTROLLER FOR LARGE AREA DETERRENCE

(76) Inventor: Robin Zweesaardt, 18 Barge La., Somerset, NJ (US) 08873

( * ) Notice: Subject to any disclaimer, the term of this patent is extended or adjusted under 35 U.S.C. 154(b) by 0 days.

(21) Appl. No.: 11/524,172

(22) Filed: Sep. 21, 2006

(51) Int. Cl.
*A01K 15/02* (2006.01)
(52) U.S. Cl. .................................................... 367/139
(58) Field of Classification Search ................ 367/139; 340/384.2; 119/713, 719
See application file for complete search history.

(56) References Cited

U.S. PATENT DOCUMENTS

| | | | | |
|---|---|---|---|---|
| 5,537,125 A | * | 7/1996 | Harrell et al. | 343/878 |
| 7,227,452 B1 | * | 6/2007 | Frost | 119/713 |
| 2003/0102964 A1 | * | 6/2003 | Hagstrum | 340/384.2 |

* cited by examiner

*Primary Examiner*—Dan Pihulic
(74) *Attorney, Agent, or Firm*—Charles I. Brodsky

(57) ABSTRACT

A towable, single axle utility trailer having a retractable tower supporting a sonic bird repeller at an upper end thereof, a solar powered panel coupled to charge a storage battery on a trailer platform, and an electric cabling connecting the battery to actuate the sonic bird repeller for providing predatory bird distress calls in creating a danger zone to frighten infesting birds away.

14 Claims, 5 Drawing Sheets

SOLAR POWERED, MOBILE BIRD PEST CONTROLLER FOR LARGE AREA DETERRENCE

CROSS-REFERENCE TO RELATED APPLICATIONS

NONE.

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to bird pest controllers for frightening infesting birds, in general, and to a bird pest controller for large area deterrence, in particular.

2. Description of the Related Art

Ultrasonic and sonic bird repellers are known to frighten infesting birds by the means of intermittent distress calls associated with their predators. Visual scare devices are also known, as are roost inhibitors. For such fixed locations as rooftops and open parking lots, species-specific repellers are oftentimes employed, with visual scare devices typically placed every 50-100 feet. One manufacturer of such bird control products is Bird-X Inc., of Chicago, Ill.

For large landfills, and for transfer depots where trash is transported to, having ultrasonic or sonic bird repellers fixed in place has been found to be an inadequate deterrent. This follows because of the numbers of units that must be utilized, and because each unit must be separately electrically powered to operate. Landfills of hundred of acres are especially attractive to marauding birds where trucks delivering trash and workers there are all in different places at the same time. Simply securing a bird repeller on a fixed platform has been found to be an insufficient way of dealing with the problem.

SUMMARY OF THE INVENTION

As will become clear from the following description, a bird pest controller for large area deterrence in accordance with the present invention includes a towable utility trailer having a support platform, a telescoping retractable tower having a lower end mounted with the platform, and a sonic bird repeller at an upper end of the tower. A storage battery on the platform is charged, by a solar powered panel on the trailer, and electric cabling connects the battery to the bird repeller components to operate it with the predatory calls.

In a preferred embodiment of the invention, the solar panel is coupled along a length of the tower between its upper and lower ends—with the panel being pivotable to capture as much sunlight as possible. A first support column on the trailer is then provided to latch the lower end of the tower when it is rotated upwardly to an erect position for sending out the predatory sounds in use. A second support column is included to latch along the length of the tower when it is rotated downwardly to a horizontal position for being transported about, or for storage. To secure the tower when rotated to its erect position, pairs of stabilizing outriggers may be provided, deployable by hand crank winches at both a front towbar of the trailer and at a rear channeling bar provided at the platform. With a retractable tower having a length of some 25-30 feet, and with a 4-sided, 20 speaker sonic bird repeller, areas of over 30 acres have been found to be quite cleared of infesting birds in this manner.

Such height of 25-30 feet will be appreciated by those skilled in the art as being a compromise between the area desired to be cleared (i.e., towers of a greater height) and the height of the transfer depots in use (which tend to be the 25-30 foot range). With the addition of visual deterrents (for example, inflatable "balloons", iridescent foils, and predatory bird replicas) attached at the top of the tower and from its sides, a significantly greater effectiveness is obtained in creating a frightening "danger zone" to these infesting birds—and in a humane manner that is harmless to them. Workers at these landfill and transfer station depots are thus protected, as will be other workers at such outdoor locations as agricultural fields, airport facilities, beach and park areas. All that is required is the towing of the utility trailer to the area in question, righting the retractable tower for use, connecting the cabling and turning on the sonic bird repeller. Afterwards, all that need be done is to return the tower to its horizontal position, latch it up secure, and tow the trailer to the next area.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1:
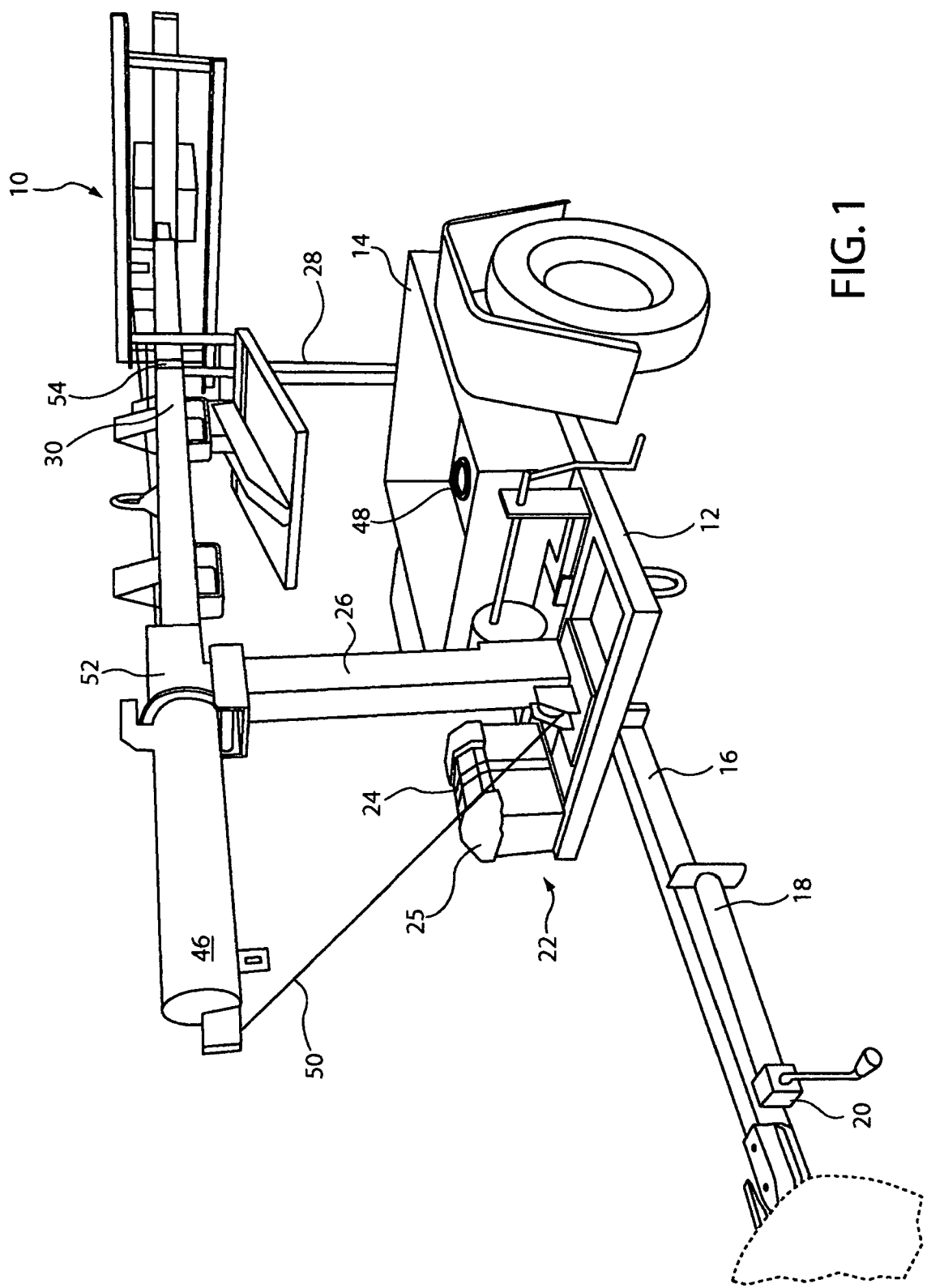
FIGS. 1-5 are pictorial views of the mobile bird pest controller of the invention in different phases of use.
Figure 2:
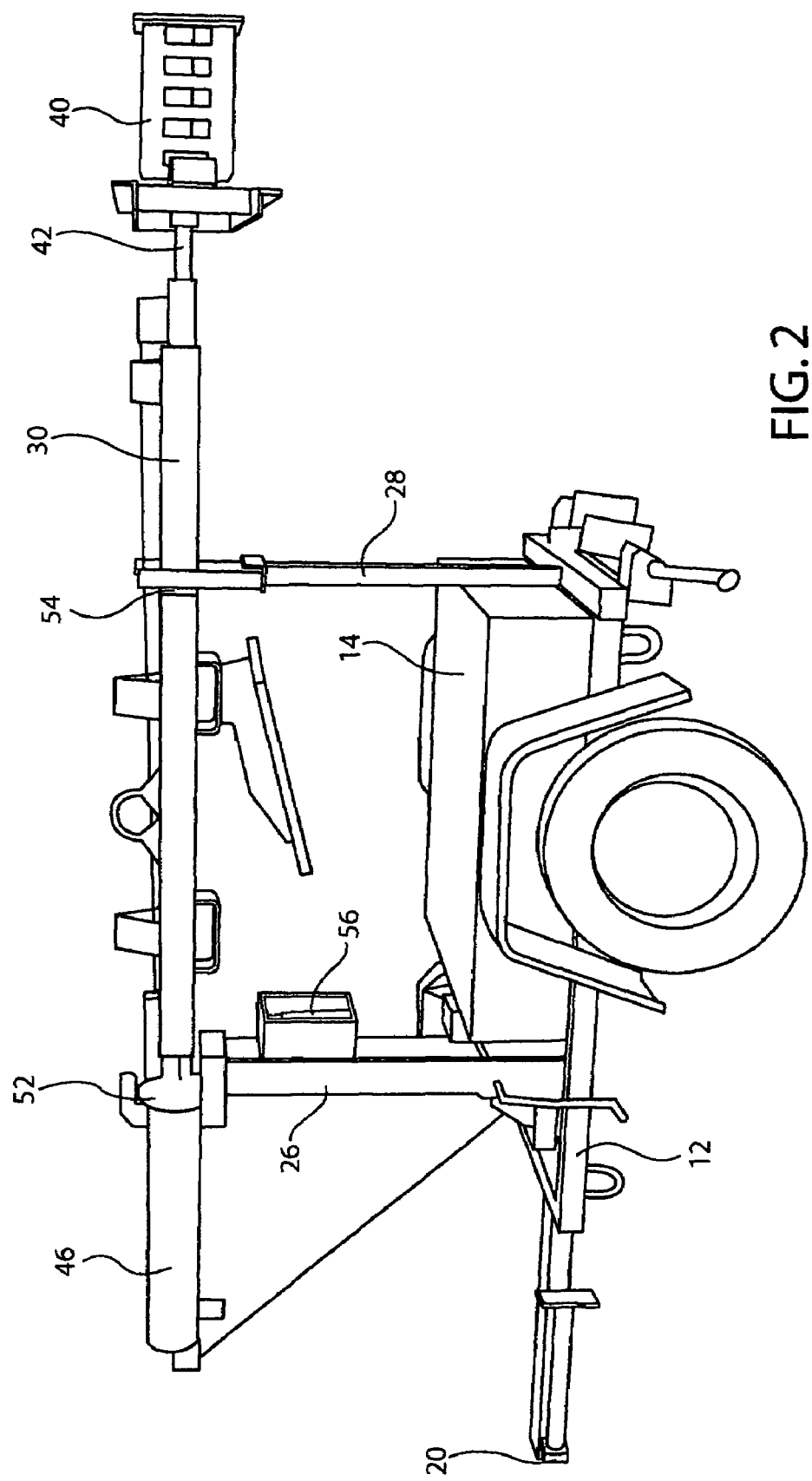

In FIGS. 1 and 2, the towable utility trailer of the invention is shown at 10 as having a support platform 12 and a carrying cage 14. A front towbar 16 couples to the pulling vehicle and a pair of stabilizing outrigger supports 18 are secured at the opposite sides of the towbar 16, being deployable by a first hand crank winch 20. In non-use, a storage battery 22 is secured to the support platform 12 by a strap 24.

Figure 3:
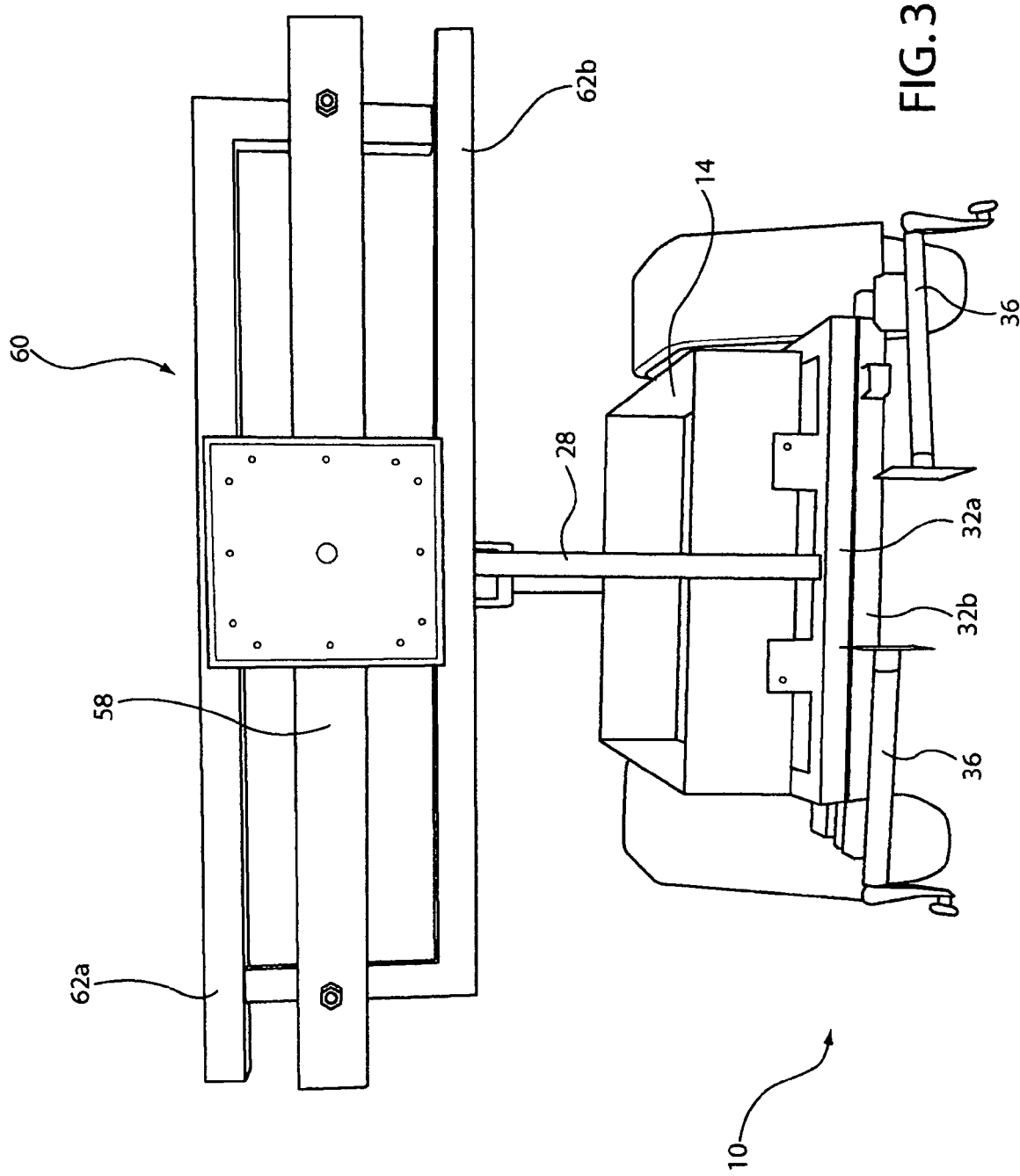

The support platform 12 includes a first support column 26 at a front end of the platform 12, and a second support column 28 at its rear end. Such columns latch the telescoping retractable tower 30 when the trailer 10 is being towed or stored ("for non-use"). A channeling bar extends in two parts 32a and 32b from the rear of the platform 12, each having its own stabilizing outrigger support 34 deployable by a second hand crank winch 36. FIGS. 1, 2 and 3 illustrate the bird pest controller with the outrigger supports 18 and 34 in their nondeployed state and with the retractable tower 30 in a horizontal position for transportation or storage, latched in the support columns 26, 28. A single axle utility trailer is preferable.

Figure 4:
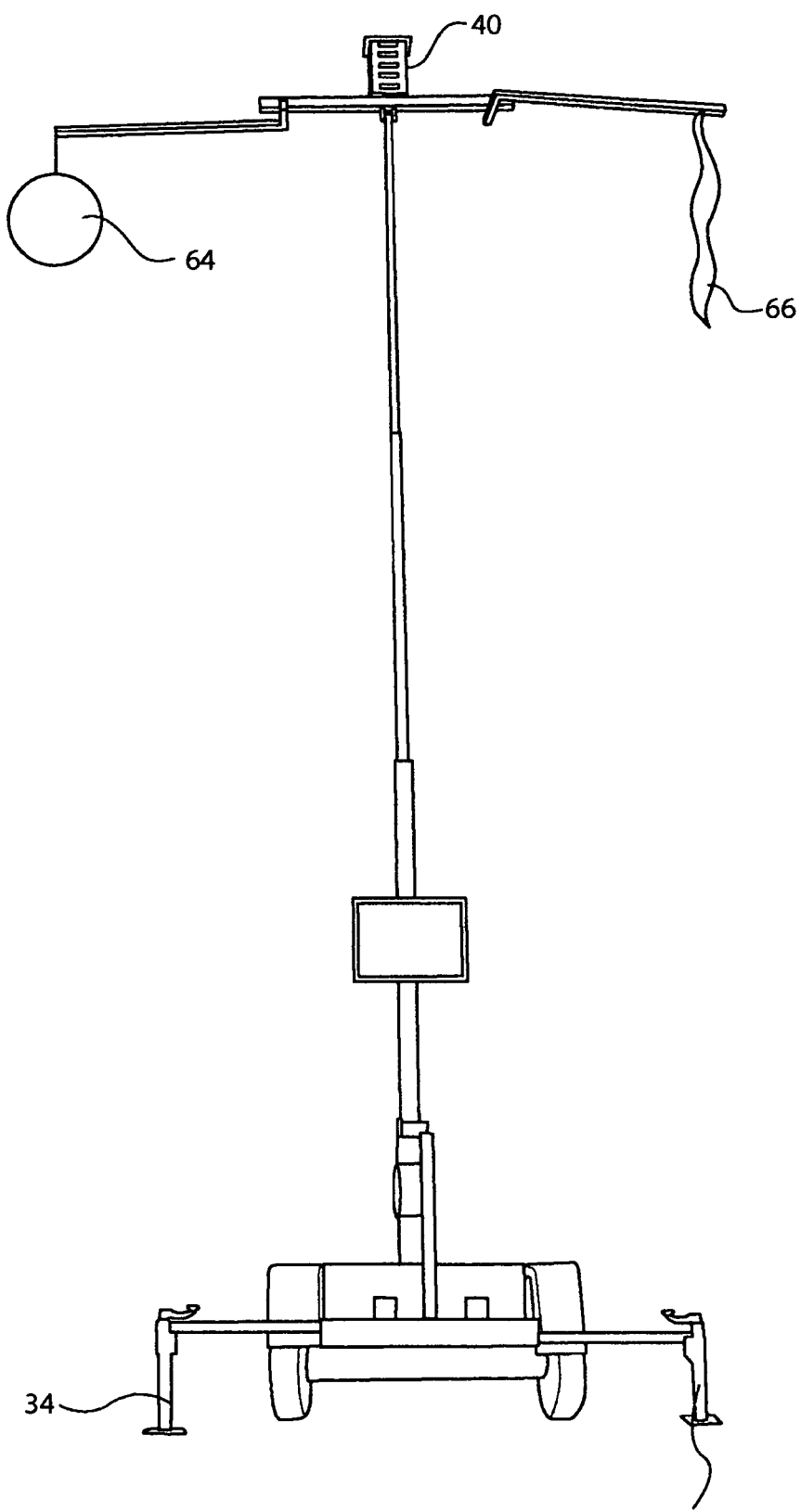
Figure 5:
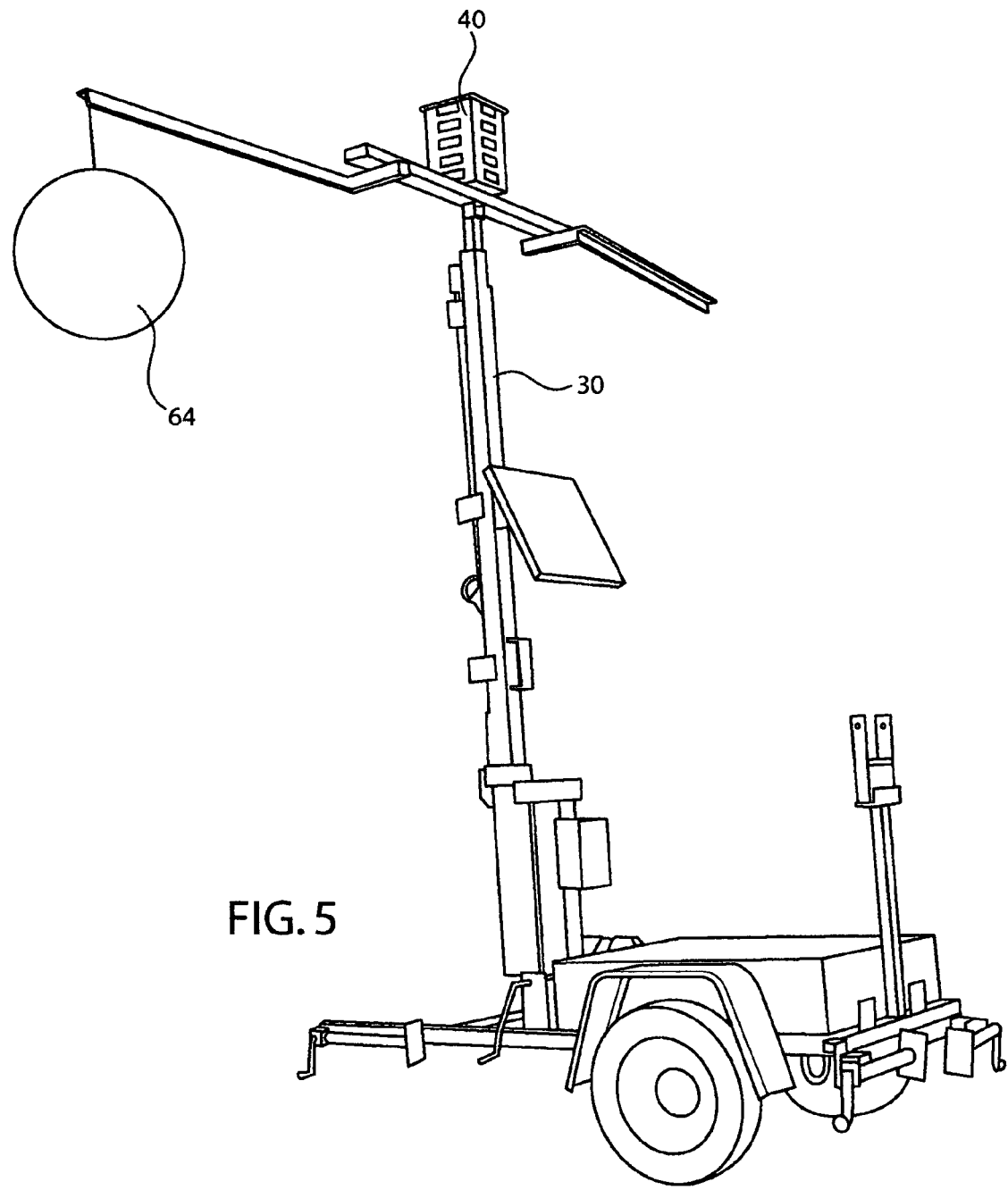

FIGS. 1 and 2 additionally show a sonic bird repeller 40 at a first, upper end 42 of the tower 30 and a solar powered panel 44 along a length of the tower between its upper end 42 and its lower end 46. Fixed, or preferably pivotable along the length of the tower 30 to capture as much sunlight as possible, the panel 44 is coupled by various cabling 48 carried in the cage 14 to the storage battery 22 so as to charge it once its strap 24 and cover 25 are removed. Loosening locking clamps (not shown) at the support columns 26, 28 allows the tower 30 to be rotated upwardly to an erect position, in allowing its end 46 to be clamped to the platform 12 under control of a locking string 50 and U-clamp sections 52, 54. The end result is as shown in FIG. 4 (which also shows the deployment of the outrigger supports 34 and the telescoping nature of the tower by the sections a, b and c). A control box for the sonic bird repeller 40 is shown at 56 in FIGS. 1, 2 and 5, and may be of the type to adjust the volume of its speakers, and their individual states of ON/OFF operation.

As will be appreciated by those skilled in the art, various other cabling may additionally be carried in the cage 14 for the storage battery 22 to actuate the bird repeller 40 by way of the control box 56. The repeller may be of any appropriate design to produce the distress cries of predatory birds in this manner, and is preferably a 4-sided unit with 5 speakers per side (for example, as available from Bird-X, Inc. as its MEGA BLASTER design). Secured to the upper end 42 of the tower by a bar extension 58, the repeller 40 is formed as part of a frame 60 which includes outwardly rotatable arms 62a, 62b (FIG. 3). Individual visual scare bird deterrents may be hung from the arms—as a moving inflatable predatory bird replica balloon 64 and an iridescent foil 66 (FIG. 4). A 12 volt capacity for the storage battery 22 has been found sufficient to operate such a sonic bird repeller as charged by the solar panel 44.

In a preferred construction of the invention, a fully extended operational height of 27 feet was selected for the tower 30 in a towable single axle utility trailer of a total length of 14 feet 10 inches with a front towbar pullable length of 4 feet 5 inches. A front width for the trailer was selected of 3 feet 5 inches, with a fender-to-fender rear width of 5 feet 1 inches increasing to 10 feet 2.5 inches when the outrigger stabilizing supports 34 are in place. With a carrying cage 14 of 3 feet 9 inches by 3 feet 2.25 inches, an overall weight was presented of some 1,180 pounds. With a width of 14 feet 2.5 inches selected with the arms 62a, 62b fully extended outwardly, the single axle trailer of the invention was easily towable on standard tires to relocate from one area to another. The height provided was also found to be quite effective in humanely humanely clearing large areas of infesting birds. As will be appreciated, 25-30 foot tower lengths encompass the height of trash transfer buildings commonly found at landfill locations, where the infesting birds may otherwise roost.

While there have been described what are considered to be preferred embodiments of the present invention, it will be readily acknowledged by those skilled in the art that modifications can be made without departing from the scope of the teachings herein. For at least such reason, therefore, resort should be had to the claims appended hereto for a true understanding of the scope of the invention.

I claim:

1. A bird nest controller for large area deterrence comprising:
    a towable utility trailer having a support platform;
    a retractable tower having a lower end mounted with said platform;
    a sonic bird repeller at an upper end of said tower;
    a storage battery on said platform;
    a solar powered panel coupled to charge said battery;
    an electric cabling connecting said battery to actuate said sonic bird repeller;
    a bar extension underlying said sonic bird repeller, to opposite ends of which individual visual scare bird deterrents are coupled; and
    wherein said sonic bird repeller is of 4 sides, having 5 audio speakers per side.

2. The bird pest controller of claim 1 wherein said solar powered panel is coupled along a length of said retractable tower between said upper and lower ends thereof.

3. The bird pest controller of claim 1 wherein said solar powered panel is pivotable along said retractable tower length.

4. The bird pest controller of claim 1, also including a first support column on said platform for latching said lower end of said retractable tower when rotated upwardly to an erect position for use, and a second support column on said platform for latching a point along said length of said retractable when rotated downwardly to a horizontal position during non-use.

5. The bird pest controller of claim 1 wherein said utility trailer includes a front towbar, on opposite sides of which a stabilizing outrigger support is coupled.

6. The bird pest controller of claim 5 wherein said outrigger support is deployable by a hand crank winch.

7. The bird pest controller of claim 1 wherein said utility trailer includes a rear channeling bar, at opposite ends of which a stabilizing outrigger support is coupled.

8. The bird post controller of claim 7 wherein said outrigger support is deployable by a hand crank winch.

9. The bird pest controller of claim 1 wherein said utility trailer includes a front towbar, on opposite sides of which a first stabilizing outrigger support is coupled and deployable by a first hand crank winch, and wherein said utility trailer includes a rear channeling bar at opposite ends of which a second stabilizing outrigger support is coupled, deployable by a second hand crank winch.

10. The bird pest controller of claim 1 wherein said retractable tower is of a length of 25-30 feet.

11. The bird pest controller of claim 1 wherein said storage battery is of 12 volt capacity.

12. A bird pest controller for large area deterrence comprising:
    a towable, single axle utility trailer having a support platform;
    a retractable tower of 25-30 foot length having a lower end mounted with said platform;
    a 4 sided, 20 speaker sonic bird repeller at an upper end of said tower;
    a storage battery of 12 volt capacity on said platform;
    a solar powered panel coupled to charge said battery;
    and an electric cabling connecting said battery to actuate said sonic bird repeller.

13. The bird pest controller of claim 12 wherein said solar powered panel is pivotable along said retractable tower length.

14. The bird pest controller of claim 12 wherein said towable single axle trailer includes a front towbar, on opposite sides of which a first stabilizing outrigger support is deployable by a first hand crank winch and wherein said utility trailer includes a rear channeling bar, on opposite sides of which a second stabilizing outrigger support is deployable by a second hand crank winch.

* * * * *